(12) United States Patent
Cheong et al.

(10) Patent No.: US 8,472,577 B2
(45) Date of Patent: Jun. 25, 2013

(54) APPARATUS AND METHOD FOR DETECTING RECEPTION SIGNAL SYMBOL SYNCHRONIZATION IN WIRELESS COMMUNICATION SYSTEM

(75) Inventors: Minho Cheong, Daejon (KR); Yu-Ro Lee, Daejon (KR); Sok-Kyu Lee, Daejon (KR); Il-Gu Lee, Seoul (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 951 days.

(21) Appl. No.: 12/274,056

(22) Filed: Nov. 19, 2008

(65) Prior Publication Data

US 2009/0161808 A1 Jun. 25, 2009

(30) Foreign Application Priority Data

Dec. 19, 2007 (KR) .................. 10-2007-0133821
May 16, 2008 (KR) .................. 10-2008-0045460

(51) Int. Cl.
*H04L 7/00* (2006.01)
(52) U.S. Cl.
USPC .................................. 375/354; 370/503
(58) Field of Classification Search
USPC .................................. 375/354; 370/503
See application file for complete search history.

(56) References Cited

U.S. PATENT DOCUMENTS

| 6,487,252 | B1 | 11/2002 | Kleider et al. | |
| 7,570,684 | B2* | 8/2009 | Zhang et al. | 375/145 |
| 7,715,511 | B2* | 5/2010 | Cheng | 375/368 |
| 2006/0126670 | A1* | 6/2006 | Jeon et al. | 370/503 |
| 2006/0285478 | A1* | 12/2006 | Gaikwad et al. | 370/203 |
| 2007/0280098 | A1* | 12/2007 | Bhatt et al. | 370/208 |
| 2010/0008216 | A1* | 1/2010 | Li et al. | 370/208 |

FOREIGN PATENT DOCUMENTS

| KR | 10-0464479 A | 12/2001 |
| KR | 10-2006-0054493 A | 5/2006 |

OTHER PUBLICATIONS

Asai, "Precise AFC scheme for performance improvement of SDM-COFDM," Vehicular Technology Conference, 2002, Proceedings, VTC 2002—Fall, 2002 IEEE 56th vol. 3 Publication Year: 2002, pp. 1408-1412 vol. 3.*

* cited by examiner

*Primary Examiner* — Juan A Torres
(74) *Attorney, Agent, or Firm* — Kile Park Reed & Houtteman PLLC

(57) ABSTRACT

Provided is an apparatus and method for detecting reception signal symbol synchronization in a wireless communication system. The method, includes: calculating a channel power value in each of multiple antennas; selecting and averaging at least 2 channel power values; compensating carrier frequency offset for an average value; and determining a symbol boundary of a reception signal according to the size of the average value compensating the carrier frequency offset.

16 Claims, 10 Drawing Sheets

APPARATUS AND METHOD FOR DETECTING RECEPTION SIGNAL SYMBOL SYNCHRONIZATION IN WIRELESS COMMUNICATION SYSTEM

CROSS-REFERENCE(S) TO RELATED APPLICATIONS

The present invention claims priority of Korean Patent Application Nos. 10-2007-0133821 and 10-2008-0045460, filed on Dec. 19, 2007 and May 16, 2008, which are incorporated herein by reference.

BACKGROUND OF THE INVENTION

1. Field of the Invention

The present invention relates to an apparatus and method for detecting reception signal symbol synchronization in a wireless communication system; and, more particularly, to an apparatus and method which prevents deterioration of synchronization performance due to difference of time responses occurring in each reception antenna and variation of delay times occurring in each frequency band when a symbol of a very high-speed wireless communication system using a multiple antenna or a multiple frequency band is synchronized.

This work was supported by the IT R&D program for MIC/IITA [2006-S-002-02, "IMT-Advanced Radio Transmission Technology with Low Mobility"].

2. Description of Related Art

Research for overcoming limitation of IMT-2000 and building a fourth generation mobile communication network has been actively progressed. The fourth generation mobile communication network is not a single communication network but a compounding communication network and has a format that diverse communication networks such as satellite communication, wireless Local Area Network (LAN), and digital broadcasting are integrated.

International Telecommunication Union (ITU) regulates that the fourth generation wireless communication provides a transmission speed of 100 Mbps while moving and a transmission speed of 1 Gbps while staying.

There are Institute of Electrical and Electronics Engineers (IEEE) 802.11b, IEEE 802.11a, IEEE 802.11n, and IEEE 802.11g as a current wireless LAN. The currently used wireless LAN satisfies IEEE 802.11b or IEEE 802.11g standard. The IEEE 802.11g supports a transmission speed ranging from 2.4 GHz band to maximum 54 Mbps. IEEE 802.11n, which is currently being developed, is expected to support a transmission speed of 540 Mbps maximally which does not satisfy the transmission speed of 1 Gbps required by the fourth generation wireless communication. Orthogonal Frequency Division Multiplexing (OFDM) and Multiple-Input Multiple-Output (MIMO) antenna technologies are core technologies for realizing the very high-speed wireless communication.

NTT DoCoMo, Inc. expects that Orthogonal Frequency Code Division Multiplexing (OFCDM) and OFDM may be used as technology for the fourth generation wireless communication. In a communication system using a broadband channel, OFCDM and OFDM show superior performance than wireless communication access based on typical Direct Sequence-Code Division Multiple Access (DS-CDMA). Performance deterioration due to interference by multi-path is remarkably reduced in OFCDM or OFDM.

Spectral efficiency should be improved to raise a transmission speed in a state with limited frequency resources. Multiple antenna technology is used as one method for improving the spectral efficiency. A transmission method such as Bell Laboratories Layered Space Time (BLAST) is suggested in order to use the multiple antenna technology. It is already known that Maximum Likelihood Detection (MLD) has better performance than V-BLAST or Minimum Mean Squared Error (MMSE) in a bit error rate or a block error rate. However, since computational complexity is very high due to exponential increase according to a modulation method and the number of antennas, it is not proper to be realized in an actual communication system. QRM-MLD, which is MLD using M-algorithm and QR decomposition, is suggested as a method for reducing complexity, which is the problem of the MLD. However, there is a possibility to be improved more.

A New Nomadic Local Area Wireless Access (NoLA) system developed in Electronics and Telecommunications Research Institute (ETRI) satisfies the transmission speed required in the fourth generation wireless communication by using the multiple antenna technology and OFDM. The NoLA system secures a transmission speed of 3.6 Gbps by applying the multiple antenna technology using 4 or 8 transmission antennas and 8 reception antennas, and using 3 frequency bands of 40 MHz in a carrier wave frequency of 5 GHz., i.e., by using a frequency band of total 120 MHz.

The NoLA system has four characteristics.

First, there is multiple antenna technology. The multiple antenna technology is a method for acquiring high spectral efficiency through antenna diversity and is used in a system for high-speed wireless communication such as IEEE 802.11g and IEEE 802.11n. IEEE 802.11n uses 4 transmission and reception antennas but the NoLA system uses 8 transmission and reception antennas to provide a higher transmission speed. The transmission speed is raised by using a plurality of antennas but it causes a problem that complexity of a receiving end such as a detector highly increases.

A second characteristic of the NoLA system is to raise a reception rate as a method for acquiring data of high reliability in a few antennas by using Maximum Density Droplet (MDD) developed by a next generation wireless LAN team of ETRI and removing interference of data received in the antennas through Successive Interference Cancellation (SIC).

A third characteristic of the NoLA system is to use Low Density Parity Check (LDPC) code as a channel coding method. Since the LDPC code is capable of performing a parallel process, it is proper to process 3 Gbps data at high-speed.

A fourth characteristic of the NoLA system is to use an OFDM method which is being actively researched as a method proper to high-speed data transmission in a wired/wireless channel. Since the OFDM method uses a plurality of carrier waves having mutual orthogonality, spectral efficiency can be raised. Since a procedure for modulating/demodulating the carrier waves in transmitting/receiving ends is the same as performing Inverse Discrete Fourier Transform (IDFT) and DFT, the OFDM method can be realized at high-speed based on Inverse Fast Fourier Transform (IFFT) and FFT. Since the OFDM method is proper to high-speed data transmission, it is adopted as a standard method for the high-speed wireless LAN of IEEE 802.11a and HIPELAN/2, broadband wireless access of IEEE 802.16, digital audio broadcasting, digital terrestrial television broadcasting, Asymmetric Digital Subscriber Line (ADSL), and Very High Bitrate DSL (VDSL).

As described in the very high-speed wireless communication technologies and the NoLA system above, it is necessary to use the multiple antenna technology and the multiple frequency band to perform very high-speed wireless communication faster than the transmission speed required in the fourth generation wireless communication. At this time, an efficient symbol synchronization method appropriate for the wireless communication system using the multiple antenna and the multiple frequency band is required.

It is well known that a method for capturing a synchronization timing by detecting a symbol boundary as a threshold detection technique using auto-correlation, which is one of the symbol synchronization methods, is a very efficient technique when one antenna and one frequency band are used. However, when the multiple antenna or the multiple frequency band are used, reception antennas have different time responses of the auto-correlation function. Also, when hardware processing the frequency band is configured as an individual board and a plurality of boards are used, there is a problem that the frequency bands have different delay times in signal response.

Variation between the time response and the delay time causes deterioration of synchronization performance as a factor that contributes to the infringement of a guard interval realized as Cyclic Prefix (CP) in the OFDM-based very highspeed wireless communication system of the Gbps level.

SUMMARY OF THE INVENTION

An embodiment of the present invention is directed to providing a symbol synchronization apparatus and method for reducing deterioration of synchronization performance due to a difference in time responses occurring between reception antennas in a wireless communication system having a multiple antenna.

Another embodiment of the present invention is directed to providing a symbol synchronization apparatus and method for reducing deterioration of synchronization performance due to variation of signal process delay times between frequency bands in a wireless communication system using a multiple frequency band.

The objects of the present invention are not limited to the above-mentioned ones. Other objects and advantages of the present invention can be understood by the following description, and become apparent with reference to the embodiments of the present invention. Also, it is obvious to those skilled in the art to which the present invention pertains that the objects and advantages of the present invention can be realized by the means as claimed and combinations thereof.

In accordance with an aspect of the present invention, there is provided a method for detecting reception signal symbol synchronization in a receiving end of a wireless communication system having multiple antennas, including: calculating a channel power value in each of multiple antennas; selecting and averaging at least 2 channel power values; compensating carrier frequency offset for an average value; and determining a symbol boundary of a reception signal according to the size of the average value compensating the carrier frequency offset.

In accordance with another aspect of the present invention, there is provided a method for detecting reception signal symbol synchronization in a receiving end of a wireless communication system using a multiple frequency band, including: calculating a channel power value in each frequency band; compensating carrier frequency offset corresponding to each frequency band for the channel power value; determining a symbol boundary of each frequency band according to the size of the channel power value after compensating the carrier frequency offset; and performing a logical operation on a symbol boundary determination result of each frequency band.

In accordance with another aspect of the present invention, there is provided a method for detecting reception signal symbol synchronization in a receiving end of a wireless communication system using a multiple antenna and a multiple frequency band, including: calculating a channel power value of the multiple antennas in each frequency band; selecting and averaging at least two channel power values in each frequency band; compensating carrier frequency offset corresponding to each frequency band for an average value; determining a symbol boundary of each frequency band according to the size of the average value after compensating the carrier frequency offset; and performing a logical operation on a symbol boundary determination result of each frequency band.

In accordance with another aspect of the present invention, there is provided an apparatus for detecting reception signal symbol synchronization in a receiving end of a wireless communication system using a multiple antenna, including: a channel power calculating means for calculating a channel power value in each of the multiple antennas; an average calculating means for selecting and averaging at least two channel power values; a frequency compensating means for compensating carrier frequency offset for the average value; and a symbol boundary determining means for determining a reception signal symbol boundary according to the size of the average value after compensating the carrier frequency offset.

In accordance with another aspect of the present invention, there is provided an apparatus for detecting reception signal symbol synchronization in a receiving end of a wireless communication system using a multiple frequency band, including: a channel power calculating means for calculating a channel power value in each frequency band; a frequency compensating means for compensating carrier frequency offset corresponding to each frequency band for the channel power value; a symbol boundary determining means for determining a symbol boundary of each frequency band according to the size of the channel power value after Compensating the carrier frequency offset; and a logical operating means for performing a logical operation on a symbol boundary determination result of each frequency band.

In accordance with another aspect of the present invention, there is provided an apparatus for detecting reception signal symbol synchronization in a receiving end of a wireless communication system using a multiple antenna and a multiple frequency band, including: a channel power calculating means for calculating a channel power value of the multiple antennas in each frequency band; an average calculating means for selecting and averaging at least two channel power values in each frequency band; a frequency compensating means for compensating carrier frequency offset corresponding to each frequency band for the average value; a symbol boundary determining means for determining a symbol boundary of each frequency band according to the size of the average value after compensating the carrier frequency offset; and a logical operating means for performing a logical operation on a symbol boundary determination result of each frequency band.

DESCRIPTION OF SPECIFIC EMBODIMENTS

The advantages, features and aspects of the invention will become apparent from the following description of the embodiments with reference to the accompanying drawings, which is set forth hereinafter. Therefore, those skilled in the field of this art of the present invention can embody the technological concept and scope of the invention easily. In addition, if it is considered that detailed description on a related art may obscure the points of the present invention, the detailed description will not be provided herein. The preferred embodiments of the present invention will be described in detail hereinafter with reference to the attached drawings.

Figure 1A:
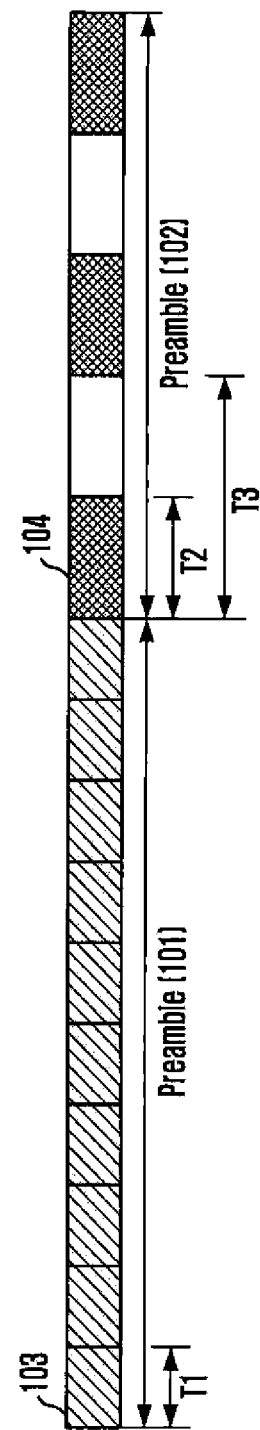
FIG. 1A is a diagram showing a preamble portion in a frame structure of a received packet.
Figure 1B:
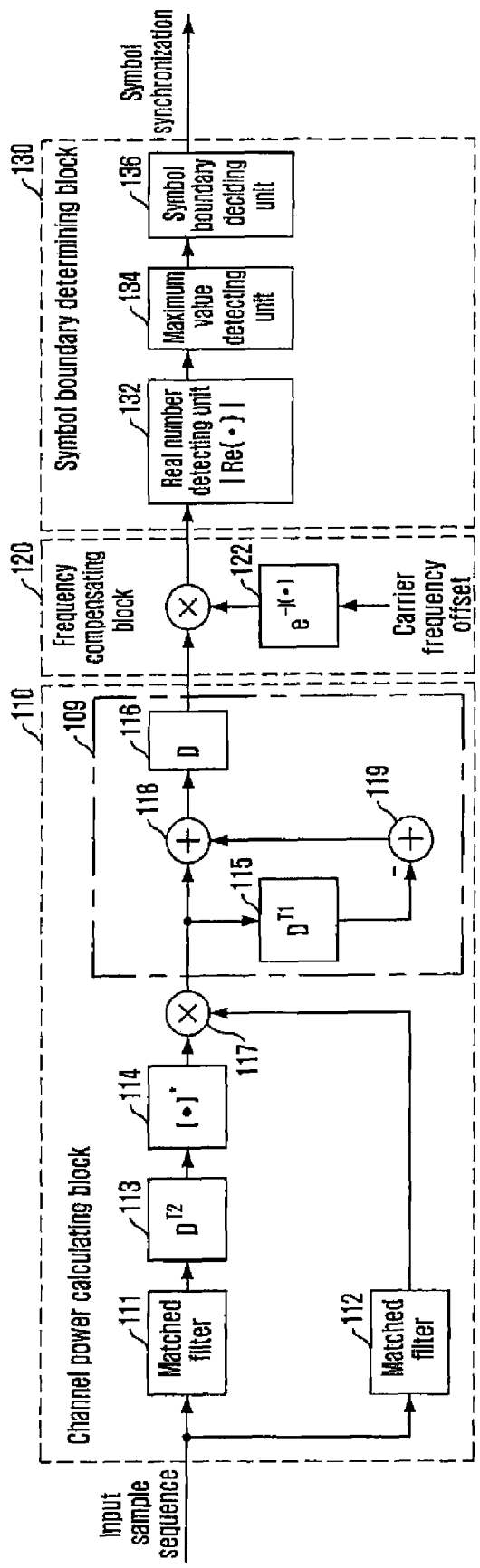
FIG. 1B is a block diagram showing a symbol synchronization detecting apparatus of a wireless communication system using a single reception antenna in accordance with an embodiment of the conventional technology.

FIGS. 1A and 1B show an operation of a symbol synchronization detecting apparatus of a wireless communication system using a single reception antenna and a single frequency band as an embodiment by conventional technology. In the embodiment by the conventional technology shown in FIGS. 1A and 1B, when preambles having different patterns at a beginning part of a packet are consecutively located, a cross correlation value between a reception signal and each preamble pattern is acquired and symbol synchronization is detected by a channel power value acquired by re-correlating the cross correlation value acquired in each preamble pattern. Symbol synchronization can be reliably detected in a channel having noise or interference through the above configuration. Operations of each portion of FIGS. 1A and 1B will be described in detail hereinafter.

FIG. 1A is a diagram showing a preamble portion in a frame structure of the received packet. As shown in FIG. 1A, it is assumed for the sake of easy explanation that two preambles 101 and 102 having different repetition patterns are located at the received packet and a method for detecting a boundary between two preambles 101 and 102 will be focused and described. Accordingly, a boundary between symbols included in the entire packet in the same manner is detected and synchronization is performed.

The preamble portion of the reception packet includes two preambles 101 and 102 having different repetition patterns. In the preamble 101, a pattern 103 having a T1 length is repeated at a T1 cycle. In the preamble 102, a pattern 104 having a T2 length is repeated at a T3 cycle.

FIG. 1B is a block diagram showing a symbol synchronization detecting apparatus of a wireless communication system using a single reception antenna as an embodiment of the conventional technology. The symbol synchronization detecting apparatus generally used in the wireless communication system using the single reception antenna and the single frequency band includes a channel power calculating block 110, a frequency compensating block 120, and a symbol boundary determining block 130.

The channel power calculating block 110 includes matched filters 111 and 112, a delayer 113, a complex conjugator 114, a moving average device 109, and a correlator 117. The matched filter 111 multiplies a matched filter coefficient by a reception signal $r_k$ and outputs a correlation value $x_k$ between the reception signal $r_k$ and a signal $a_k$ corresponding to one cycle T1 of the preamble 101. The matched filter coefficient is a value $a^*_{-k}$ taking complex conjugation after conversely setting an order of one cycle signal $a_k$ of the preamble 101 on a time axis. That is, the output $x_k$ of the matched filter 111 is as shown in Equation 1.

$$x_k = r_k * a^*_{-k} \quad \text{Eq. 1}$$

The reception signal $r_k$ is a result that effect and noise $n_k$ of a transmission channel $h_k$ is added to one cycle signal $a_k$ of a preamble transmitted from the transmitting end and is expressed as Equation 2. A correlation value $x_k$ between the reception signal and the preamble 101 is as shown in Equation 3.

$$r_k = a_k * h_k + n_k \quad \text{Eq. 2}$$

$$x_k = r_k * a^*_{-k} = (a_k * h_k + n_k) * a^*_{-k} = a_k * h_k * a^*_{-k} + n_k * a^*_{-k} \quad \text{Eq. 3}$$

When it is assumed as shown in Equation 4 that an auto-correlation between preambles is a delta function $\delta_k$ as an ideal preamble characteristic, a correlation value $x_k$ between the reception signal $r_k$ and the preamble 101 is as expressed in Equation 5. When it is assumed that there is no effect of noise and interference, the correlation value $x_k$ between the reception signal $r_k$ and the preamble 101 becomes a channel response coefficient $h_k$.

$$a_k * a^*_{-k} \sim \delta_k \quad \text{Eq. 4}$$

$$x_k \sim \delta_k * h_k + w_k = h_k + w_k \sim h_k \quad \text{Eq. 5}$$

The matched filter 112 multiplies a matched filter coefficient by the reception signal $r_k$ and outputs a correlation value $y_k$ between the reception signal $r_k$ and the signal $b_k$ corresponding to a repetition portion T2 of one cycle T3 signal of the preamble 102. The matched fitter coefficient is a value $b^*_{-k}$ taking complex conjugation after conversely setting an order of a signal on a portion T2 of one cycle signal of the preamble 102 on a time axis. That is, an output $y_k$ of the matched filter 111 is as shown in Equation 6.

$$y_k = r_k * b^*_{-k} \quad \text{Eq. 6}$$

As described above, when it is assumed that auto-correlation between preambles is a delta function as a preamble characteristic, the correlation value $y_k$ between the reception signal and the preamble 102 becomes a channel response coefficient $h_k$. When it is assumed that a timing of k=0 is a starting point of the preamble 102, Equation 6 becomes the same as Equation 7.

$$y_k \sim h_{k-T2} \quad \text{Eq. 7}$$

The delayer 113 delays the correlation value $x_k$ of the matched filter 111 as much as T2 length. The complex conjugator 114 outputs a complex conjugation $x_{k-T2}$ of a delayed correlation value $x_{k-T2}$. The correlator 117 outputs a correlation value $z_k$ between an output $x_{k-T2}$ of the complex conjugator 114 and an output $y_k$ of the matched filter 112. The correlation value $z_k$ is as shown in Equation 8.

$$z_k = y_k \cdot (x_{k-T2})^* \sim h_{k-T2} \cdot (h_{k-T2})^* = |h_{k-T2}|^2 \quad \text{Eq. 8}$$

That is, when the output values of two matched filters 111 and 112 are rearranged through time delay on a time axis and correlated, the result value approximately becomes a power value of a channel.

The moving average device 109 acquires a moving average value $m_k$ having a window size as much as a cycle T1 of the preamble 101 with respect to the correlation value $z_k$ as shown in Equation 9.

$$m_k = \sum_{i=0}^{T1-1} z_{k-i} \approx \sum_{i=0}^{T1-1} |h_{k-i-T2}|^2 \quad \text{Eq. 9}$$

A frequency response characteristic of the moving average device 109 becomes a sin c(T1*f) function functioning as a low-pass filter and a bandwidth of the low-pass filter is in inverse proportion to a window size T1 of the moving average device 109. That is, when the window size of the moving average device 109 increases, the bandwidth decreases, to thereby increase the ability to remove noise.

The moving average device 109 includes delayers 115 and 116, an adder 118, and a subtractor 119. The delayer 115 delays and outputs the correlation value $z_k$ as much as a T1 length. The subtractor 119 subtracts an output $z_{k-T1}$ of the delayer 115 from the output of the moving average device 109, which is an output of the delayer 116. The adder 118 adds the correlation value $z_k$ and the output of the subtractor 119 and outputs the result to the delayer 116. The output of the delayer 116 becomes the moving average value $m_k$ as shown in Equation 9. That is, when it is assumed that the output of the moving average device 109 is given as shown in Equation 9 and the correlation value $z_k$ is inputted in the moving average device 109, the output of the subtractor 119 becomes $m_{k-1} - z_{k-T1}$ and the output $m_k$ of the adder 118 is as shown in Equation 10.

$$\begin{aligned} m_k &= m_{k-1} - z_{k-T1} + z_k \\ &= \left( \sum_{i=0}^{T1-1} z_{k-1-i} \right) - z_{k-T1} + z_k \\ &= \left( \sum_{i=0}^{T1-1} z_{k-i} \right) \end{aligned} \quad \text{Eq. 10}$$

Since the output of the moving average device 109 becomes the summation of T1 correlation values, which is the same as the former output value of the moving average device 109, the output of the moving average device 109 is given as the moving average value as shown in Equation 9.

In the embodiment of the conventional technology shown in FIG. 1B, the frequency compensating block 120 for compensating estimated frequency offset in preparation for a case that frequency offset occurs by carrier wave may be included. The frequency compensating block 120 compensates the frequency offset by the carrier wave by multiplying a frequency compensate value $e^{-j2\pi\Delta f}$ 122 by the moving average value $m_k$. $\Delta f$ is a compensate frequency.

Subsequently, the symbol boundary determining block 130 determines a boundary timing between symbols. The symbol boundary determining block 130 may include a real number detecting unit 132, a maximum value detecting unit 134, and a symbol boundary deciding unit 136.

The real number detecting unit 132 takes an absolute value $|\text{Re}\{m_k\}|$ of a real number value of the moving average value $m_k$. The maximum value detecting unit 134 calculates the maximum value of the detected former real number value $|\text{Re}\{m_k\}|$. At this time, the maximum value of a predetermined period may be detected by setting start and end in calculating the maximum value in order to improve performance of synchronization detection. The symbol boundary deciding unit 136 detects symbol synchronization or frame synchronization when the maximum value is larger than the predetermined threshold value. The threshold value is decided as a value corresponding to the half of the channel power value and the channel power is measured by channel estimation. Also, the symbol boundary deciding unit 136 detects symbol synchronization when an absolute value $|\text{Re}\{m_k\}|$ of a real number part detected in the maximum value detecting unit 134 becomes the maximum value. When the symbol synchronization is detected, the synchronization procedure ends and other portions of the packet are received.

In the embodiment described above, the matched filters 111 and 112 are used to compute the cross correlation value of the reception signal and the preamble. However, calculating the cross correlation value through other methods as well as the method using the matched filter is easy for those skilled in the art in which the present invention is included.

Figure 2:
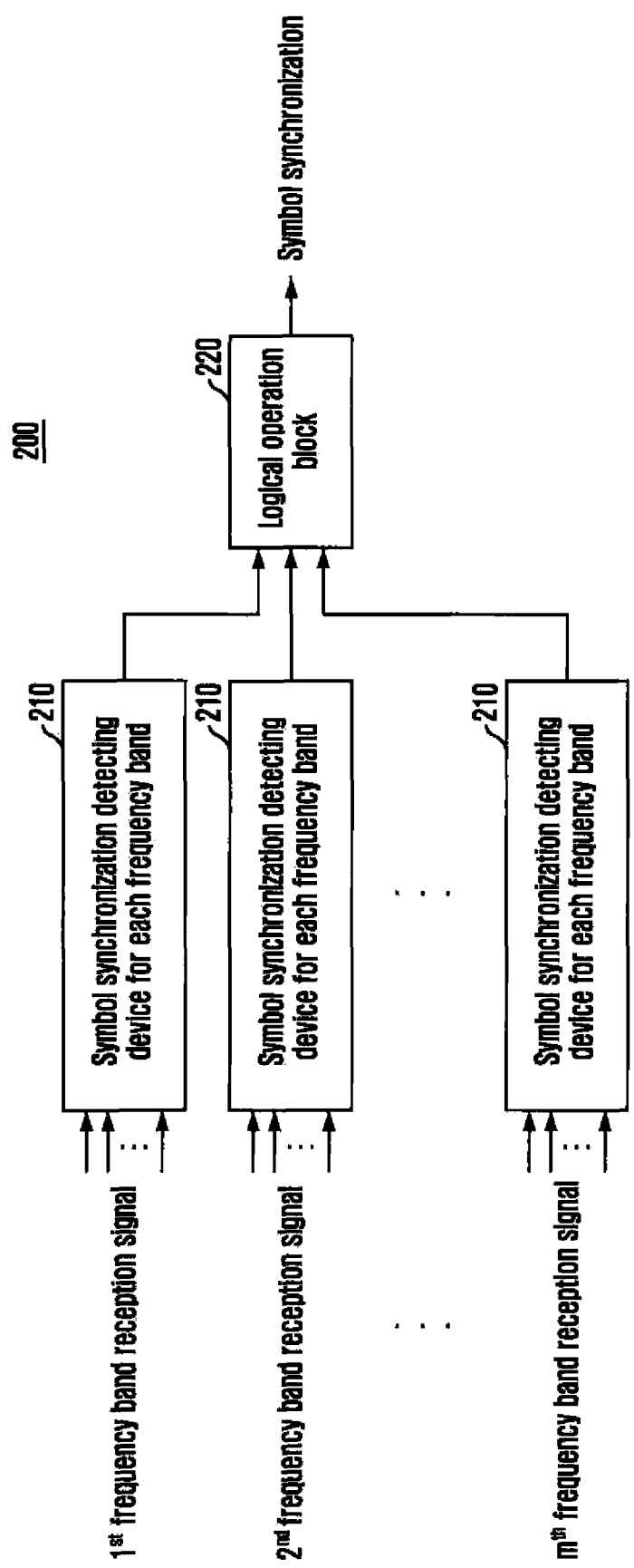
FIG. 2 is a block diagram showing a symbol synchronization detecting apparatus 200 of the wireless communication system using multiple antennas or multiple frequency bands in accordance with an embodiment of the present invention.

FIG. 2 is a block diagram showing a symbol synchronization detecting apparatus 200 of the wireless communication system using multiple antennas or multiple frequency bands in accordance with an embodiment of the present invention. As shown in FIG. 2, the symbol synchronization detecting apparatus 200 of the wireless communication system includes a symbol synchronization detecting device 210 for each frequency band and a logical operation block 220. In detecting symbol synchronization in the multiple frequency band, the present invention applies a logical operation method between frequency bands as a condition for threshold detection of the auto-correlation function. For example, when a logical operation for performing an AND operation on the entire multiple frequency band is adopted, the present invention applies a method for recognizing and synchronizing only a boundary where the entire symbol synchronization of each frequency band is detected as a symbol boundary.

The symbol synchronization detecting device 210 for each frequency band respectively receives signals from a first frequency band to an $m^{th}$ frequency band. Since signals are received through a multi-path in each frequency band when multiple antennas are used, a flow of a reception signal is expressed as an arrow. The symbol synchronization detecting device 210 for each frequency band detects symbol synchronization from the signal received in each frequency band.

When m frequency bands are used as shown in the drawing, total m symbol synchronization detection results are outputted from the symbol synchronization detecting device 210 for each frequency band. The logical operation block 220 increases stability of symbol synchronization detection by integrating the results and performing the predetermined logical operation.

For the sake of easy explanation of this paragraph, a plurality of frequency bands are expressed in small letters of English alphabet and the output of the symbol synchronization detecting device 210 for each frequency band is expressed in capital letters corresponding to the small letters.

For example, as one embodiment of the present invention, the outputs of the symbol synchronization detecting device 210 for each frequency band become A, B and C, respectively, in a wireless communication system using 3 frequency bands a, b and c and become inputs of the logical operation block 220. When the logical operation block 220 performs the logical operation of A AND B AND C to detect symbol synchronization, a timing that a symbol boundary is detected in all of the a, b and c bands is determined as the entire symbol synchronization, to thereby allowing the system to be strong in time delay variation between the frequency bands.

As another embodiment of the present invention, in a communication system using 3 frequency bands described above, when the logical operation block 220 is configured to perform the logical operation of ((A AND B) OR (C AND (A X OR B))), symbol synchronization is detected according to a decision timing of the symbol boundary in more than 2 frequency bands among 3 frequency bands. As another embodiment of the present invention, in case of a wireless communication system using 8 frequency bands of a to h, the logical operation block 220 is configured diversely according to a method such as more than 6 symbol boundaries among 8 frequency bands detect symbol synchronization at the same timing. In the above embodiment, the logical operation block 220 may be realized as a logic gate or a multiplexer.

When hardware is configured as different boards for each frequency band in realizing the wireless communication system using the multiple frequency band, delay time variation increases. However, as suggested in the present invention, guard interval infringement of the reception packet due to delay time variation is reduced by configuring the logical operation block 220 for the multiple frequency band, to thereby stabilize synchronization performance.

Figure 3:
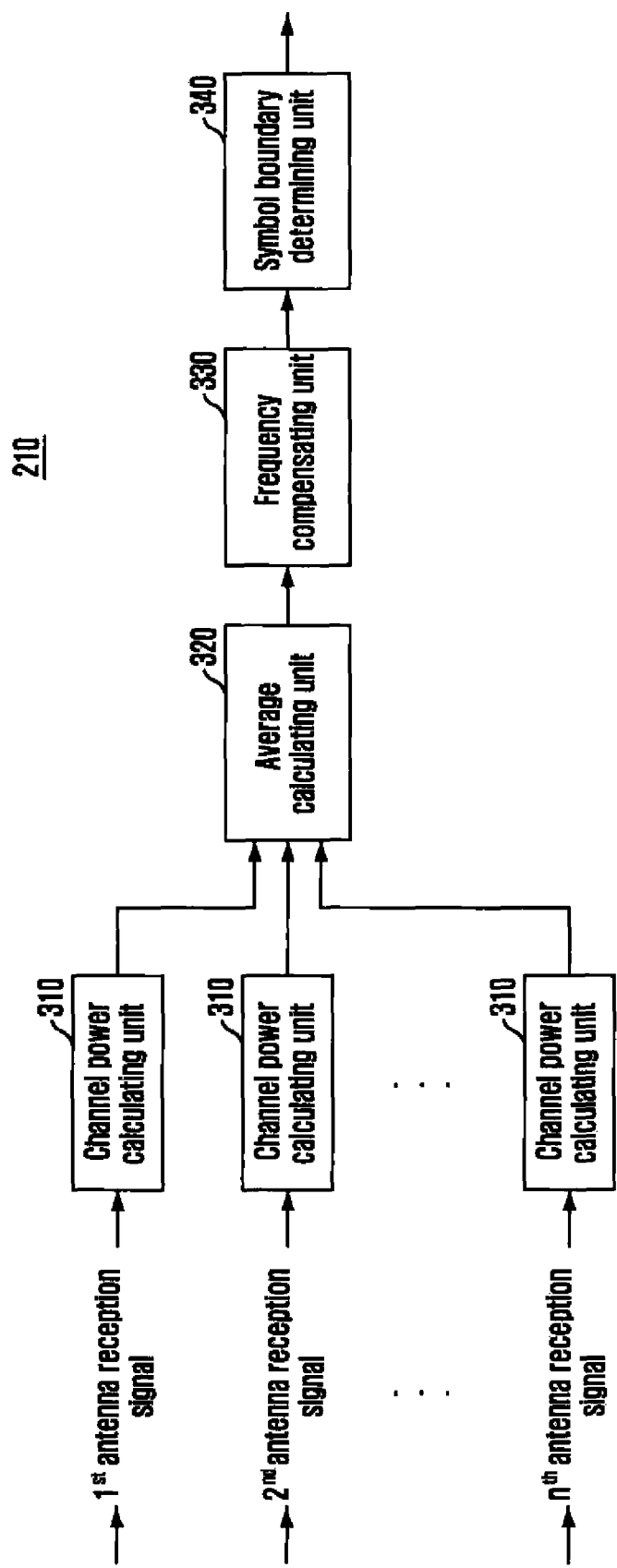
FIG. 3 is a block diagram showing a symbol synchronization detecting device 210 for each frequency band of FIG. 2.

FIG. 3 is a block diagram showing the symbol synchronization detecting device 210 for each frequency band of FIG. 2. As shown in FIG. 3, the symbol synchronization detecting device 210 for each frequency band includes a channel power calculating unit 310, an average calculating unit 320, a frequency compensating unit 330, and a symbol boundary determining unit 340. When symbol synchronization is detected in the wireless communication system using the multiple antennas, the present invention applies a method for selecting and averaging a part of the reception antennas or the entire reception antennas in auto-correlation for synchronization timing detection. The reception antenna to calculate the average is selected from the large reception power to the small reception power.

The channel power calculating unit 310 receives signals transmitted from the first to $n^{th}$ antennas in a specific frequency band. The communication system may include more than n reception antennas. As shown in FIG. 3, the channel power calculating unit 310 calculates channel power on n reception signals. The channel power is calculated on each reception antenna and the method for acquiring cross correlation by using the matched filter may be adopted. The average calculating unit 320 selects 2 to n antennas among n reception antennas after calculating channel power and averages channel power of the selected reception antennas. For example, when 8 reception antennas are used, 4 or 6 reception antennas are selected in turn from the reception antenna of the large channel power to the reception antenna of the small channel power.

The frequency compensating unit 330 compensates carrier frequency offset (CFO) estimated in a specific frequency band for the output of the average calculator. Subsequently, the symbol boundary determining unit 340 detects a symbol boundary according to the method used in the convention technology described above according to the size of the average value of the channel power, i.e., the output of the frequency compensating unit 330, all or some of the antennas after compensating the carrier frequency offset for each frequency band. For example, the symbol boundary is determined when the channel power average value is the maximum or when the maximum value of the channel power average value is larger than the predetermined threshold value.

When the multiple antennas are used in realizing the wireless communication system, difference of time responses in each reception antenna may occur in a procedure of taking cross correlation in the channel power calculating unit 310 and the difference may deteriorate reliability of synchronization detection. The reliability of threshold detection is improved by taking antenna diversity effect on synchronization detection by averaging reception power on all or some of the antennas based on the average calculating unit 320 of the present invention and applying the average value on the synchronization detection.

Functions performed by the successive apparatuses 310, 320, 330 and 340 of FIG. 3 and the former devices are performed on the first and $m^{th}$ frequency bands in the symbol synchronization detecting device 210 for each frequency band shown in FIG. 2.

Figure 4:
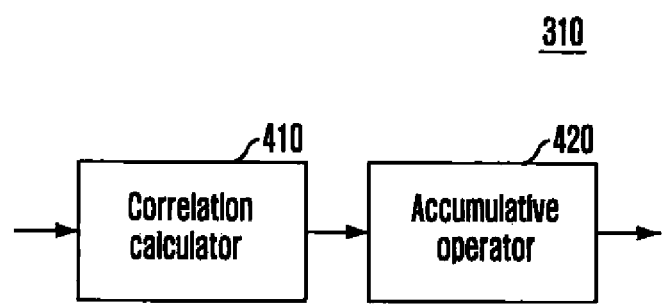
FIG. 4 is a block diagram showing a channel power calculating unit 310 of FIG. 3.

FIG. 4 is a block diagram showing the channel power calculating unit 310 of FIG. 3. As shown in FIG. 4, the channel power calculating unit 310 includes a correlation calculator 410 and an accumulative operator 420. The correlation calculator 410 approximately acquires a channel power value by taking cross correlation by setting a coefficient on a preamble according to a method using the matched filter described above. The accumulative operator 420 realizes a function of removing noise from the approximate channel power value acquired in the correlation calculator 410 as an accumulative operation such as a low-pass filter. Detailed operation and functions of the correlation calculator 410 and the accumulative operator 420 will be described in accordance with an embodiment with reference to FIGS. 6 and 7.

Figure 5:
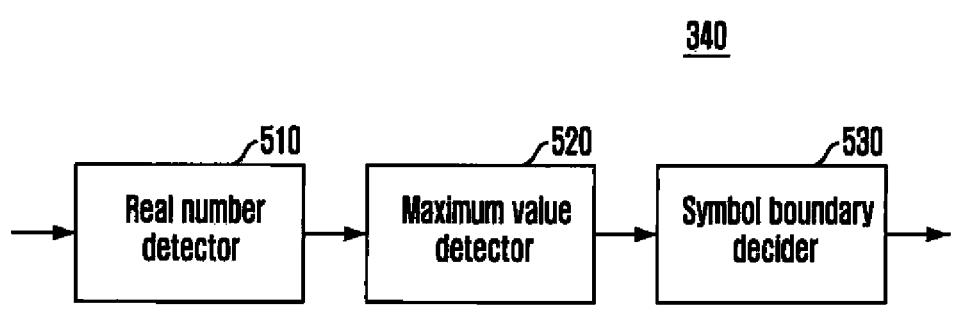
FIG. 5 is a block diagram showing a symbol boundary determining unit 340 of FIG. 3.

FIG. 5 is a block diagram showing the symbol boundary determining unit 340 of FIG. 3. The symbol boundary determining unit 340 includes a real number detector 510, a maximum value detector 520, and a symbol boundary decider 530.

The symbol boundary determining unit 340 in accordance with the present invention determines a symbol boundary by a value that carrier frequency offset is compensated for the channel power average value of the part of the reception antennas or the entire reception antennas. Accordingly, the real number detector 510 detects only a real number part $Re\{\cdot\}$ on the channel power average value after compensating the carrier frequency offset and detects a size $|Re\{\cdot\}|$ by taking an absolute value. The maximum value detector 520 searches a maximum value $Max|Re\{\cdot\}|$ by comparing the sizes. At this time, the maximum value detector 520 can search the maximum value not in the entire signal, but in a predetermined period. The symbol boundary decider 530 decides a symbol boundary at the maximum value. Otherwise, the symbol boundary decider 530 compares the maximum value with the predetermined threshold value by using the comparator and decides a symbol boundary when the maximum value is larger than the threshold value. More detailed information of the symbol boundary determining unit 340 is described in accordance with the embodiment with reference to FIG. 9.

Figure 6:
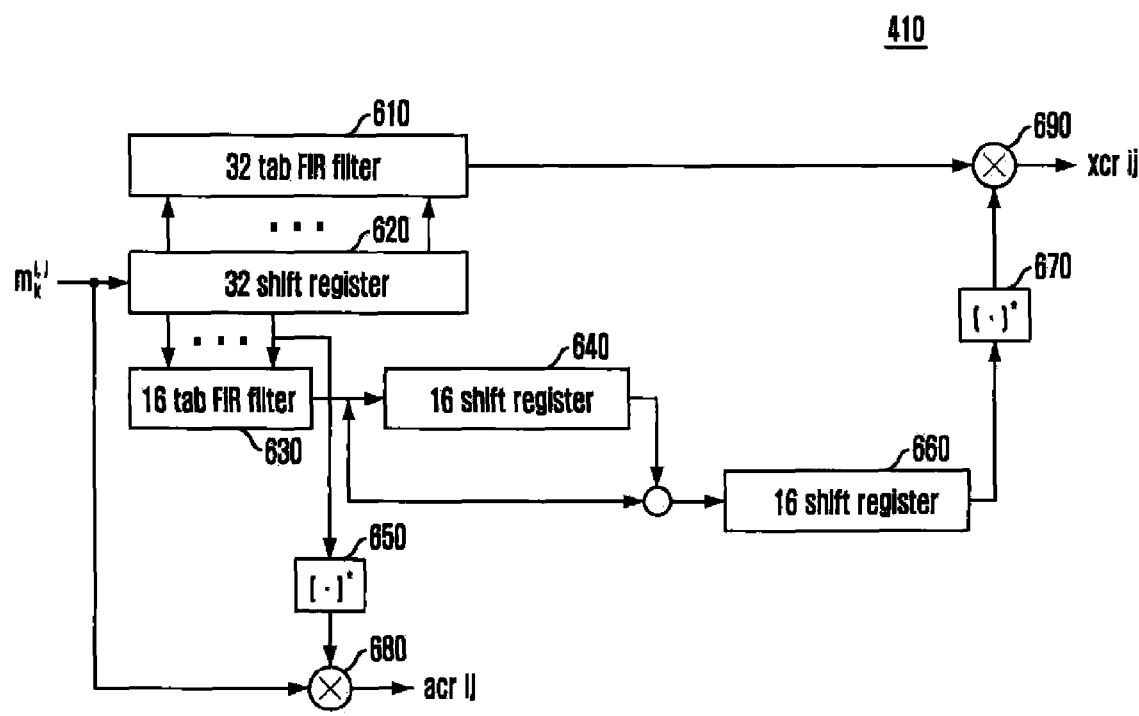
FIG. 6 is a block diagram illustrating a correlation calculator 410 of FIG. 4.

FIG. 6 is a block diagram illustrating the correlation calculator 410 of FIG. 4. As shown in FIG. 6, the correlation calculator 410 includes a 32 tab finite impulse response (FIR) filter 610, which is a matched filter, a 16 tab FIR filter 630, a 32 shift register 620, 16 shift registers 640 and 660, complex conjugators 650 and 670, and correlators 680 and 690.

The symbol synchronization detecting apparatus is for detecting a boundary between symbols in the reception packet. Accordingly, the correlation calculator 410 decides the coefficient reversely on the time of the complex conjugation of two short training signal sequences based on the 32 tab FIR filter 610, which is the matched filter. i and j are channel indexes. The correlation calculator 410 decides the coefficient reversely on the time of the complex conjugation in a latter half of a long training signal sequence based on the 16 shift registers 640 and 660 and the 16 tab FIR filter 630, which is the matched filter. The correlation calculator 410 takes cross correlation with the result of the filter, and two cross correlation values are accumulated and has a maximum peak value at the end of the short training signal sequence. The peak value becomes an approximate channel power value.

Figure 7:
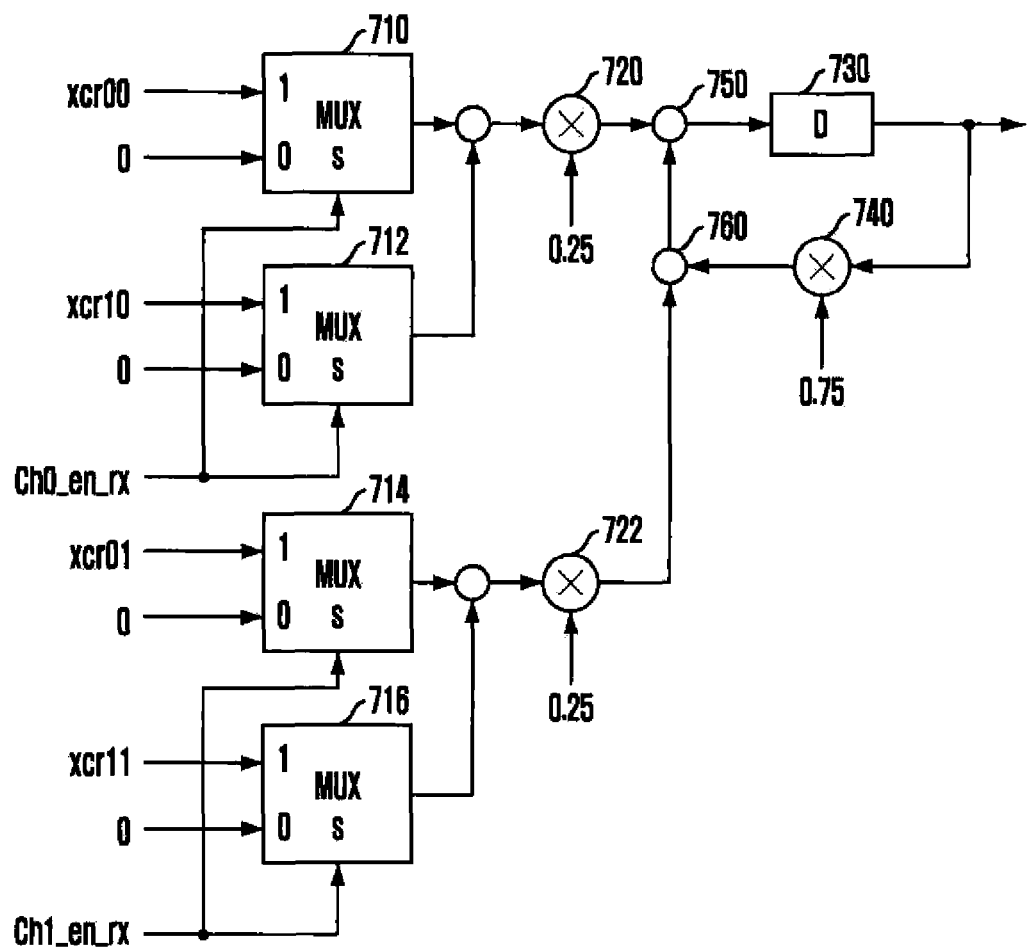
FIG. 7 is a block diagram illustrating an accumulative operator 420 of FIG. 4.

FIG. 7 is a block diagram illustrating the accumulative operator 420 of FIG. 4. As shown in FIG. 7, the accumulative operator 420 includes multiplexers 710, 712, 714 and 716 for channel selection, multipliers 720, 722 and 740, the delayer 730, and adders 750 and 760.

The accumulative operator 420 performs an accumulative operation based on the cross correlation value acquired in each channel of the correlation calculator 410 and programmed register bit channel enable value Ch0_en_rx and Ch1_en_rx. At this time, input from a non-used channel is set as 0 and an accumulative operation realized as an infinite impulse response (IIR) filter in the embodiment of FIG. 7 is a function of $0.25/(1-0.75D)$. That is, the multipliers 720 and 722 multiply a first coefficient, e.g., 0.25, by the correlation value selected by the multiplexers 710, 712, 714 and 716. The multiplier 740 multiplies a second coefficient, e.g., 0.75, by the output of the delayer 730. The adder 760 summates and outputs the results of two multipliers 722 and 740, and the adder 750 outputs a value acquired by summating the results of the adder 760 and the multiplier 720. The delayer 730 delays and outputs the result of the adder 750 to the accumulative operator 420. The values of the first and second coefficients are smaller than 1 and the second coefficient is larger than the first coefficient. In this configuration, the output of the accumulative operator 420 shows a low-pass filter characteristic in transformation into a frequency domain.

Figure 8:
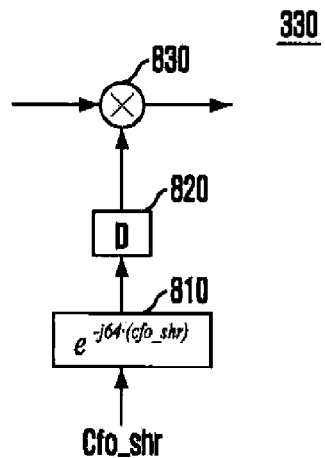
FIG. 8 is a block diagram illustrating a frequency compensating unit 330 of FIG. 3.

FIG. 8 is a block diagram illustrating the frequency compensating unit 330 of FIG. 3. As shown in FIG. 8, the frequency compensating unit 330 includes a carrier wave frequency compensation value 810, a delayer 820, and a multiplier 830.

The input of the frequency compensating unit 330 becomes the output of the average calculating unit 320 described above. That is, an averaged value is received by selecting some or all of channel power values calculated for each reception antenna in a specific frequency band. Carrier frequency offset (CFO) estimated by multiplying the carrier wave frequency compensation value 810 delayed by the delayer 820 by the average value is compensated. When the multiple frequency band is used, the frequency compensating unit 330 compensates the carrier frequency offset in each frequency band and the carrier wave frequency compensation value 810 becomes the value estimated in each frequency band.

Figure 9:
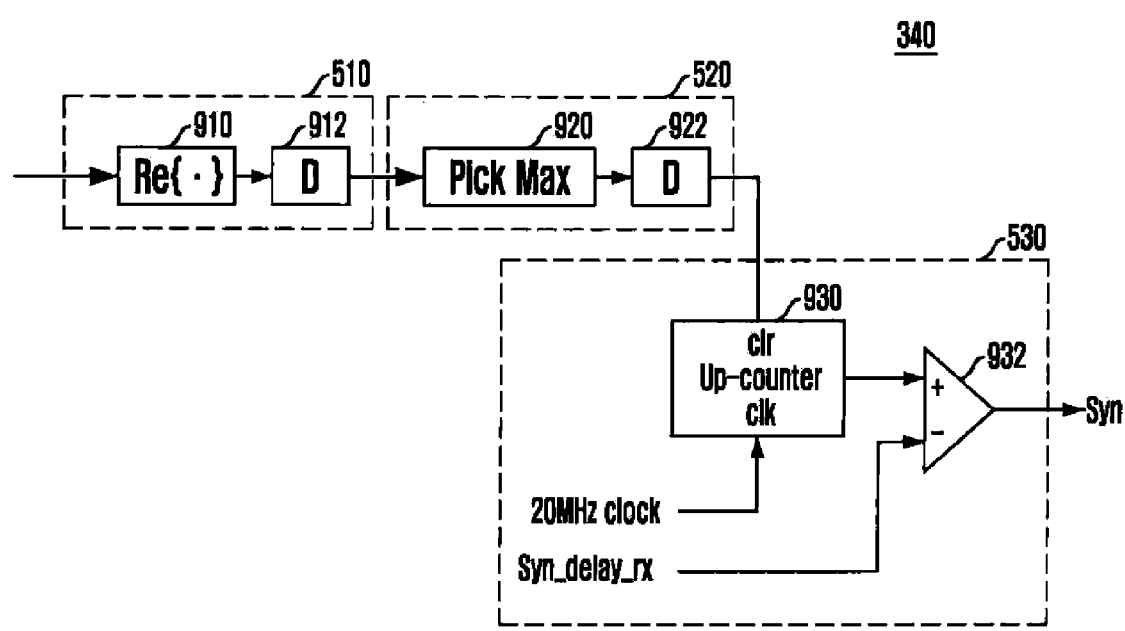
FIG. 9 is a block diagram illustrating the symbol boundary determining unit 340 of FIG. 3.

FIG. 9 is a block diagram illustrating the symbol boundary determining unit 340 of FIG. 3. As shown in FIG. 9, the symbol boundary determining unit 340 includes the real number detector 510, the maximum value detector 520, and the symbol boundary decider 530.

The real number detector 510 includes a real number detector 910 and a delayer 912. When the real number detector 910 takes only a real number in a channel power average value after compensating carrier frequency offset, this signal is delayed by the delayer 912 and transmitted to the maximum value detector 520. A maximum value detecting device 920 of the maximum value detector 520 detects a maximum value in the channel power average value where only the real number part remains and a delayer 922 delays and transmits the maximum value to the symbol boundary decider 530.

The symbol boundary decider 530 includes a counter 930 and a comparator 932. The counter 930 receives and stores the maximum value detected in the maximum value detector 520 and increases the count index. When the maximum value is input in the counter 930, the maximum value is compared with the former maximum value. When the current maximum value is larger than the former maximum value, a procedure of storing the current maximum value as a new maximum value, initializing the count index into 0, and re-searching a maximum value is repeated. When the comparator 932 determines that the count index value arrives at a specific value Syn_delay_rx, which is a programmable register value, symbol synchronization ends and a symbol synchronization signal is outputted. A value appropriate for the Syn_delay_rx value is searched such that symbol synchronization can be performed in a start portion of the second long training signal sequence. Meanwhile, the counter is limited to be performed for a predetermined time to prevent unlimited repetition of the symbol synchronization detecting operation. The counter is operated during only the limited period by the programmed register value and initialized when the carrier wave symbol synchronization is detected and ends.

Figure 10:
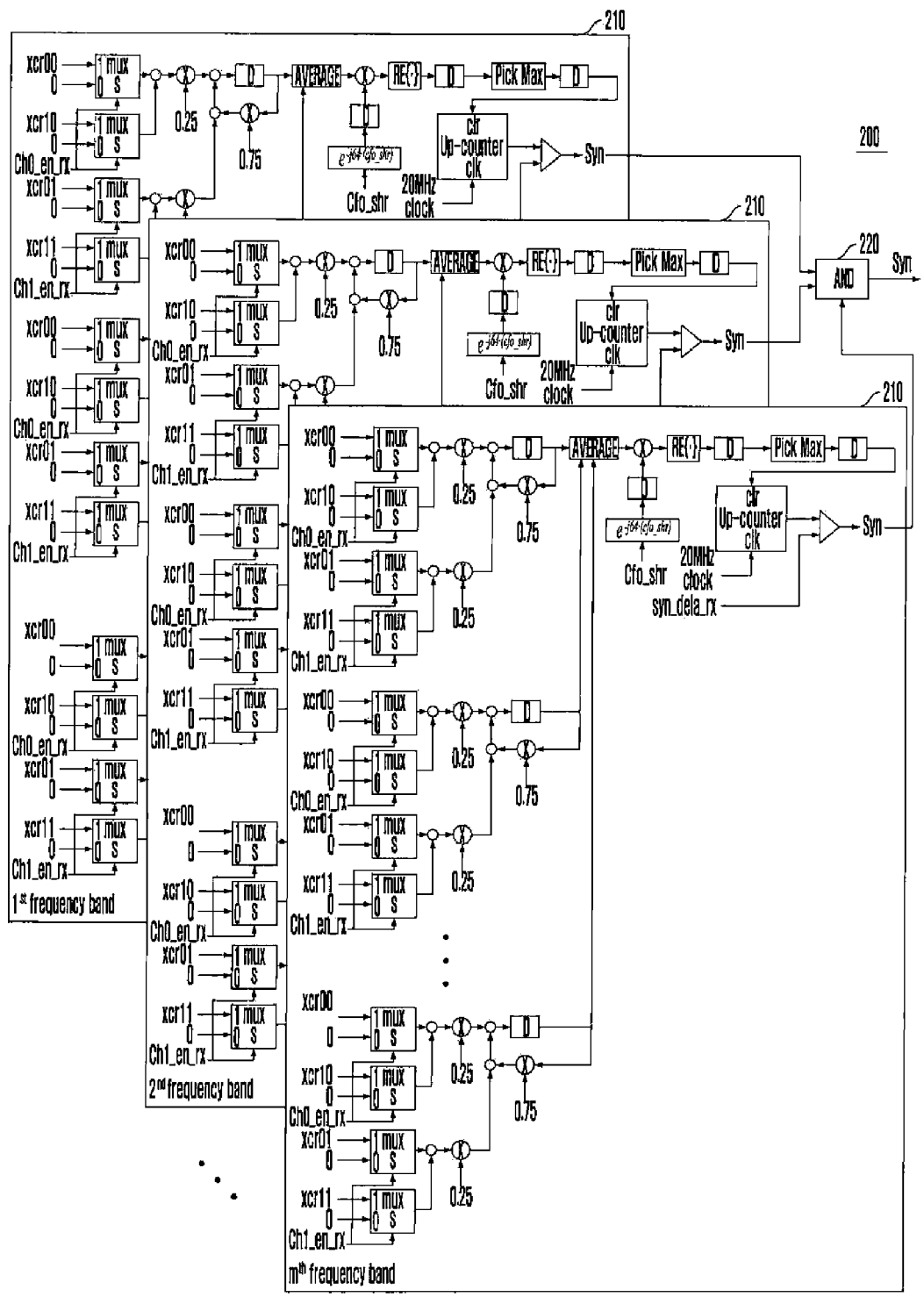
FIG. 10 is a diagram illustrating a symbol synchronization detecting apparatus 200 of the wireless communication system of FIG. 2.

FIG. 10 is a diagram illustrating the symbol synchronization detecting apparatus 200 of the wireless communication system of FIG. 2. As shown in FIG. 10, the symbol synchronization detecting apparatus 200 of the wireless communication system includes the symbol synchronization detecting device 210 for each frequency band and the logical operation block 220.

In the 1st to mth frequency bands, the symbol synchronization detecting device 210 for each frequency band detects symbol synchronization in each frequency band. The logical operation block 220 performs a logical operation on the detected symbol synchronization, e.g., performs AND on the result of the entire frequency band in the embodiment of FIG. 10, and detects symbol synchronization of the reception signal according to the logical operation result. The symbol synchronization detecting device 210 for each frequency band is shown as combination of the embodiments as shown in FIGs. 7 to 9 and their operations follow the above detailed description. (The correlation calculator 410 of FIG. 6 has been omitted from FIG. 10 for clarity.)

Figure 11:
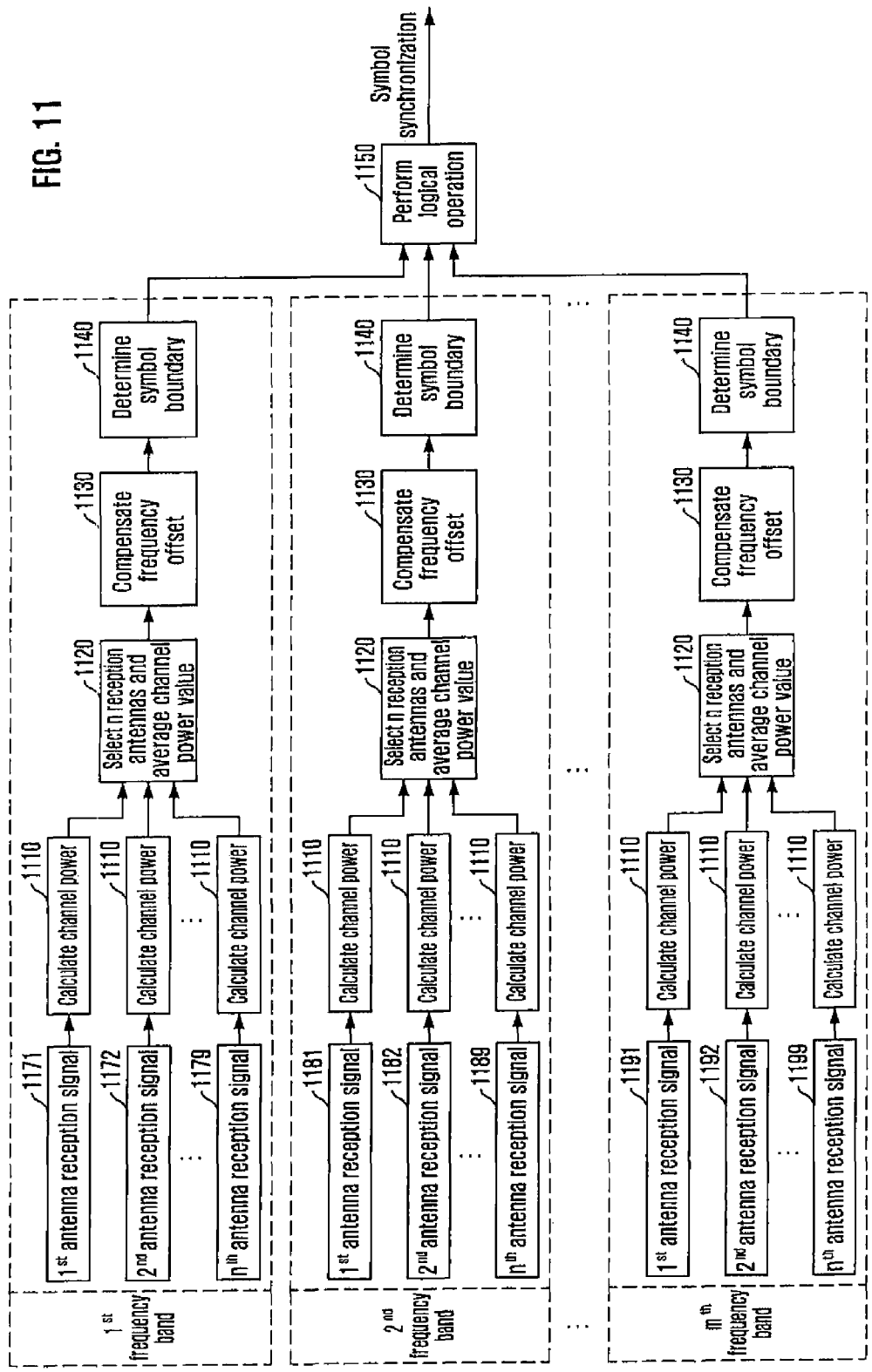
FIG. 11 is a flowchart describing a symbol synchronization detecting method of the wireless communication system using the multiple antenna and multiple frequency band in accordance with an embodiment of the present invention.

FIG. 11 is a flowchart describing a symbol synchronization detecting method of the wireless communication system using the multiple antenna and multiple frequency band in accordance with an embodiment of the present invention. The symbol synchronization detecting method in accordance with the present invention will be described hereinafter with reference to FIGS. 2 and 3.

The wireless communication system in accordance with the present invention uses the multiple frequency band and receives signals from each frequency band. In FIG. 11, procedures performed in each frequency band are divided by boxes of a dotted line and the procedures inside the boxes are performed by the symbol synchronization detecting device 210 for each frequency band of FIG. 2.

The 1st and nth antennas receive signals in each frequency band. That is, channel power is calculated at step 1110 from reception signals 1171, 1172 and 1179 of each antenna of the first frequency band, reception signals 1181, 1182 and 1189 of each antenna of the second frequency band, and reception signals 1191, 1192 and 1199 of each antenna of the mth frequency band. The procedure of calculating the channel power at the step 1110 is performed in the channel power calculating unit 310 of FIG. 3. The calculated channel power is transmitted to the average calculating unit 320 of FIG. 3. The average calculating unit 320 selects some or all of the n reception antennas and calculates an average of the channel power value on the selected antenna at step 1120. The frequency compensating unit 330 of FIG. 3 compensates carrier frequency offset for the calculated average value at step 1130 and determines a symbol boundary based on the frequency compensated-value at step 1140. The procedure of determining the symbol boundary at the step 1140 is performed in the symbol boundary determining unit 340 of FIG. 3.

When the symbol boundary is determined in each frequency band at the step 1140, the logical operation block 220 of FIG. 2 receives a symbol boundary determination result, performs a logical operation at step 1150, and detects symbol synchronization of the system reception signal.

As described above, the present invention efficiently performs symbol synchronization by preventing guard interval infringement in the wireless communication system using the multiple antenna or the multiple frequency band.

In particular, the present invention reduces deterioration of the symbol synchronization performance due to difference of time responses occurring between the multiple antennas by applying the method for selecting and averaging some or all of the antennas in turn from the antenna of large reception power. Also, the present invention stabilizes symbol synchronization to be strong to variation of the signal process delay time between frequency bands by using a threshold detection condition of the auto-correlation function between the multiple frequency band as a logical operation result such as AND.

The present invention is applicable to the wireless communication system using the multiple antennas or the multiple frequency band. In particular, the present invention is usable for synchronization of the wireless communication system supporting a transmission speed higher than a Gbps level such as the fourth generation wireless communication system.

Foregoing devices and systems can be implemented as hardware, software, or some combination of these. In hardware implementation, a module used to detect symbol synchronization can be implemented as more than one application specific integrated circuits (ASIC), a digital signal processor (DSP), a digital signal processing device (DSPD), a programmable logic device (PLD), field programmable gate arrays (FPGA), a processor, a controller, a micro-controller, microprocessors, other electronic units designed to perform the functions described above, and the combination of these. Software can be implemented through the module performing the functions described herein. A software code is stored in the memory unit and is executed by the processor. The memory unit can be implemented in the internal or external processor. In this case, the memory can be connected with the processor through well-known various means.

As described above, the technology of the present invention can be realized as a program. A code and a code segment forming the program can be easily inferred from a computer programmer of the related field. Also, the realized program is stored in a computer-readable recording medium, i.e., information storing media, and is read and operated by the computer, thereby realizing the method of the present invention. The recording medium includes all types of recording media which can be read by the computer, e.g., incorporeal media such as carrier wave as well as corporeal media such as compact disc (CD) and digital versatile disc (DVD).

While the present invention has been described with respect to the specific embodiments, it will be apparent to those skilled in the art that various changes and modifications may be made without departing from the spirit and scope of the invention as defined in the following claims.

What is claimed is:

1. A method for detecting reception signal symbol synchronization in a receiving end of a wireless communication system having multiple antennas, comprising:
    calculating a channel power value in each of the multiple antennas;
    selecting and averaging at least two of the channel power values to produce an average value;
    compensating carrier frequency offset for the average value, wherein the compensating comprises multiplying, using a multiplier, the average value by a carrier wave frequency compensation value, and wherein the carrier wave frequency compensation value is provided to the multiplier after being delayed by a delayer; and
    determining a symbol boundary of a reception signal according to the size of the average value after compensating the carrier frequency offset.

2. The method of claim 1, wherein said calculating a channel power value comprises:
    calculating a correlation value between the reception signal and a predetermined synchronization signal in each of the multiple antennas; and
    performing an accumulative operation on the correlation value.

3. The method of claim 1, wherein said determining a symbol boundary comprises:
    detecting a real component of the average value after compensating the carrier frequency offset;
    detecting the maximum value of the real component in a predetermined period; and
    deciding the symbol boundary according to the detected maximum value.

4. The method of claim 1, wherein the at least two of the channel power values on the reception antenna are selected and averaged in turn from the large value to the small value.

5. A method for detecting reception signal symbol synchronization in a receiving end of a wireless communication system using multiple frequency bands, comprising:
    calculating, in each of the frequency bands, a channel power value;
    compensating, in each of the frequency bands, carrier frequency offset for the channel power value;
    determining, in each of the frequency bands, a symbol boundary according to the size of the channel power value after compensating the carrier frequency offset;
    performing a logical operation on the symbol boundary determination result of each of the frequency bands to determine whether at least two of the symbol boundary determination results have the same timing; and
    detecting symbol synchronization when at least two of the symbol boundary determination results have the same timing.

6. The method of claim 5, wherein an AND operation is performed on the symbol boundary determination result of each of the frequency bands.

7. A method for detecting reception signal symbol synchronization in a receiving end of a wireless communication system using multiple antennas and multiple frequency bands, comprising:

calculating, in each of the frequency bands, a channel power value in each of the multiple antennas;

selecting and averaging, in each of the frequency bands, at least two of the channel power values to produce an average value;

compensating, in each of the frequency bands, carrier frequency offset for the average value;

determining, in each of the frequency bands, a symbol boundary according to the size of the average value after compensating the carrier frequency offset; and performing a logical operation on the symbol boundary determination result of each of the frequency bands.

8. The method of claim 7, wherein the performing the logical operation comprises performing the logical operation to determine whether at least two of the symbol boundary determination results have the same timing, and wherein the method further comprises:

detecting symbol synchronization when at least two of the symbol boundary determination results have the same timing.

9. An apparatus for detecting reception signal symbol synchronization in a receiving end of a wireless communication system using multiple antennas, comprising:

a channel power calculating means for calculating a channel power value in each of the multiple antennas;

an average calculating means for selecting and averaging at least two of the channel power values to produce an average value;

a frequency compensating means for compensating carrier frequency offset for the average value, wherein the frequency compensating means performs the compensating by multiplying, using a multiplier, the average value by a carrier wave frequency compensation value, and wherein the carrier wave frequency compensation value is provided to the multiplier after being delayed by a delayer; and a symbol boundary determining means for determining a reception signal symbol boundary according to the size of the average value after compensating the carrier frequency offset.

10. The apparatus of claim 9, wherein the channel power calculating means comprises:

a correlation calculator for calculating a correlation value between the reception signal and a predetermined synchronization signal in each of the multiple antennas; and an accumulative operator for performing an accumulative operation on the correlation value.

11. The apparatus of claim 9, wherein the symbol boundary determining means comprises:

a real number detector for detecting a real component of the average value after compensating the carrier frequency offset;

a maximum value detector for detecting a maximum value of the real component in a predetermined period; and a symbol boundary decider for deciding the symbol boundary according to the detected maximum value.

12. The apparatus of claim 9, wherein the average calculating means selects and averages the at least two of the channel power values on the reception antenna in turn from the large size to the small size.

13. An apparatus for detecting reception signal symbol synchronization in a receiving end of a wireless communication system using multiple frequency bands, comprising:

a channel power calculating means for calculating, in each of the frequency bands, a channel power value;

a frequency compensating means for compensating, in each of the frequency bands, carrier frequency offset for the channel power value;

a symbol boundary determining means for determining, in each of the frequency bands, a symbol boundary according to the size of the channel power value after compensating the carrier frequency offset; and a logical operating means for:
performing a logical operation on the symbol boundary determination result of each of the frequency bands to determine whether at least two of the symbol boundary determination results have the same timing; and
detecting symbol synchronization when at least two of the symbol boundary determination results have the same timing.

14. The apparatus of claim 13, wherein the logical operating means performs an AND operation on the symbol boundary determination result of each of the frequency bands.

15. An apparatus for detecting reception signal symbol synchronization in a receiving end of a wireless communication system using multiple antennas and multiple frequency bands, comprising:

a channel power calculating means for calculating, in each of the frequency bands, a channel power value in each of the multiple antennas;

an average calculating means for selecting and averaging, in each of the frequency bands, at least two of the channel power values to produce an average value;

a frequency compensating means for compensating, in each of the frequency bands, carrier frequency offset for the average value;

a symbol boundary determining means for determining, in each of the frequency bands, a symbol boundary according to the size of the average value after compensating the carrier frequency offset; and a logical operating means for performing a logical operation on the symbol boundary determination result of each of the frequency bands.

16. The apparatus of claim 15, wherein the logical operating means performs the logical operation to determine whether at least two of the symbol boundary determination results have the same timing, and wherein the logical operating means is further configured to detect symbol synchronization when at least two of the symbol boundary determination results have the same timing.

* * * * *